(12) United States Patent
Yamada et al.

(10) Patent No.: US 7,297,933 B2
(45) Date of Patent: Nov. 20, 2007

(54) PROBE, NEAR-FIELD LIGHT GENERATION APPARATUS INCLUDING PROBE, EXPOSURE APPARATUS, AND EXPOSING METHOD USING PROBE

(75) Inventors: Tomohiro Yamada, Kanagawa (JP); Natsuhiko Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 10/440,237

(22) Filed: May 19, 2003

(65) Prior Publication Data

US 2003/0230709 A1 Dec. 18, 2003

(30) Foreign Application Priority Data

Jun. 14, 2002 (JP) .............................. 2002-175105

(51) Int. Cl.
*G01N 13/14* (2006.01)
*G02B 26/00* (2006.01)

(52) U.S. Cl. .................. 250/227.26; 977/862; 977/868

(58) Field of Classification Search ................ 356/501; 977/862, 868; 250/227.26; G01N 13/14
See application file for complete search history.

(56) References Cited

U.S. PATENT DOCUMENTS

| | | | | |
|---|---|---|---|---|
| 5,254,854 A | * | 10/1993 | Betzig ......................... | 250/234 |
| 5,305,091 A | * | 4/1994 | Gelbart et al. .............. | 356/620 |
| 5,354,985 A | * | 10/1994 | Quate ......................... | 250/234 |
| 5,369,488 A | * | 11/1994 | Morokuma .................. | 356/493 |
| 5,389,779 A | * | 2/1995 | Betzig et al. ................ | 250/216 |
| 5,416,327 A | * | 5/1995 | Weiss et al. ................. | 250/307 |
| 5,936,237 A | * | 8/1999 | van der Weide ............ | 250/234 |
| 6,080,586 A | * | 6/2000 | Baldeschwieler et al. ... | 436/173 |
| 6,211,532 B1 | * | 4/2001 | Yagi ............................ | 257/40 |
| 6,335,522 B1 | * | 1/2002 | Shimada et al. ............ | 250/201.3 |
| 6,408,122 B1 | * | 6/2002 | Shimada et al. ............ | 385/129 |
| 6,408,123 B1 | * | 6/2002 | Kuroda et al. .............. | 385/130 |
| 6,430,324 B1 | * | 8/2002 | Muramatsu et al. ......... | 385/12 |
| 6,724,718 B1 | * | 4/2004 | Shinohara et al. .......... | 369/300 |
| 6,785,445 B2 | * | 8/2004 | Kuroda et al. .............. | 385/38 |
| 2001/0007347 A1 | | 7/2001 | Shimada et al. ............ | 250/216 |
| 2002/0007667 A1 | * | 1/2002 | Pohl et al. .................... | 73/105 |
| 2002/0154859 A1 | * | 10/2002 | Kuroda et al. .............. | 385/31 |
| 2003/0190425 A1 | * | 10/2003 | Lugstein et al. ............ | 427/264 |

FOREIGN PATENT DOCUMENTS

EP 853251 A2 * 7/1998

(Continued)

OTHER PUBLICATIONS

G. Binning et al., "Surface Studies by Scanning Tunneling Microscopy", Physical Review Letters, The American Physical Society, vol. 49, No. 1, 1982, pp. 57-61.

(Continued)

*Primary Examiner*—Jack Keith
*Assistant Examiner*—Ari M. Diacou
(74) *Attorney, Agent, or Firm*—Fitzpatrick, Cella, Harper & Scinto

(57) ABSTRACT

A probe which generates near-field light from an aperture at the tip is provided. The tip is covered with a lightproof member, at least the interior of the lightproof member is in the shape of a cone having a plane-shaped top, and the aperture is provided in the top plane.

8 Claims, 13 Drawing Sheets

FOREIGN PATENT DOCUMENTS

| | | | |
|---|---|---|---|
| EP | 1089066 A1 * | 4/2001 |
| JP | 08-262038 | 10/1996 |
| JP | 10-293134 | 11/1998 |
| JP | 2000065713 A * | 3/2000 |
| JP | 2000074812 A * | 3/2000 |
| JP | 2000131216 A * | 5/2000 |
| JP | 2000-171380 | 6/2000 |
| JP | 2000199737 A * | 7/2000 |
| JP | 2000329677 A * | 11/2000 |
| JP | 2001-004520 | 1/2001 |
| JP | 2001056279 A * | 2/2001 |
| JP | 2001116678 A * | 4/2001 |
| JP | 2001141634 A * | 5/2001 |
| JP | 2001291258 A * | 10/2001 |
| JP | 2002014029 A * | 1/2002 |
| JP | 2002098621 A * | 4/2002 |
| WO | WO 0115151 A1 * | 3/2001 |
| WO | WO 0194926 A1 * | 12/2001 |

OTHER PUBLICATIONS

Office Action dated Mar. 7, 2006 of the Japanese counterpart application 2002-175105.

* cited by examiner

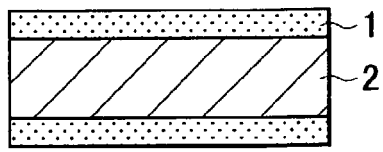
FIG. 2A
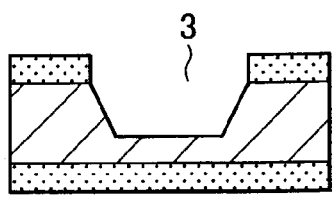
FIG. 2B
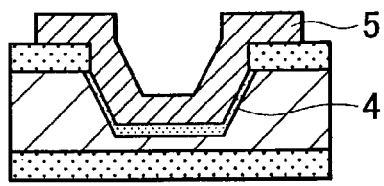
FIG. 2C
FIG. 2D
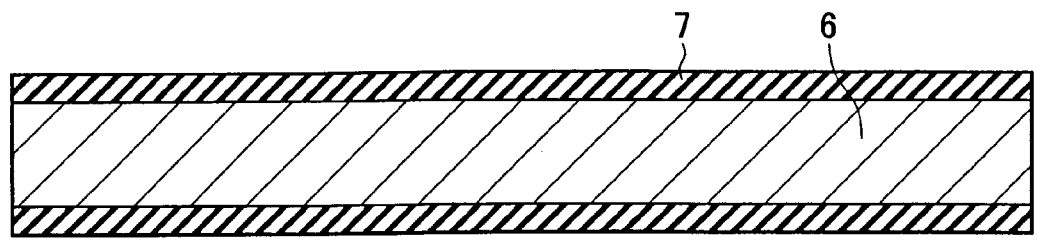
FIG. 2E
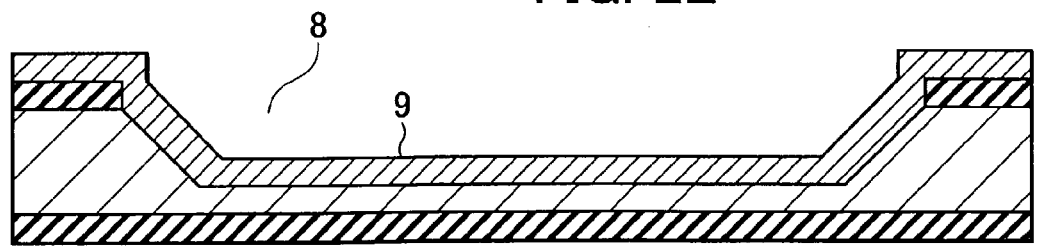
FIG. 2F
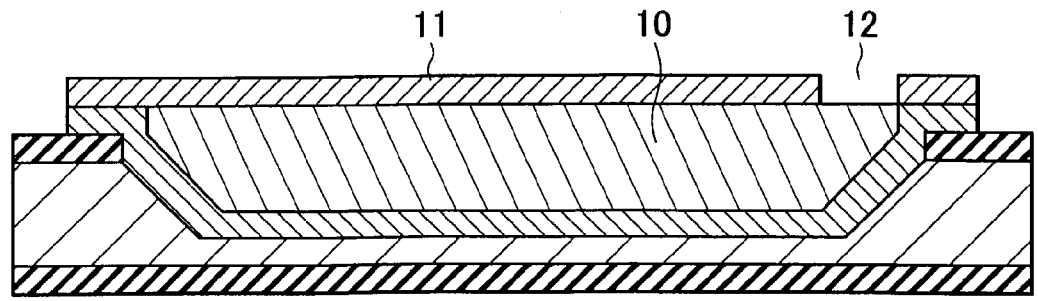

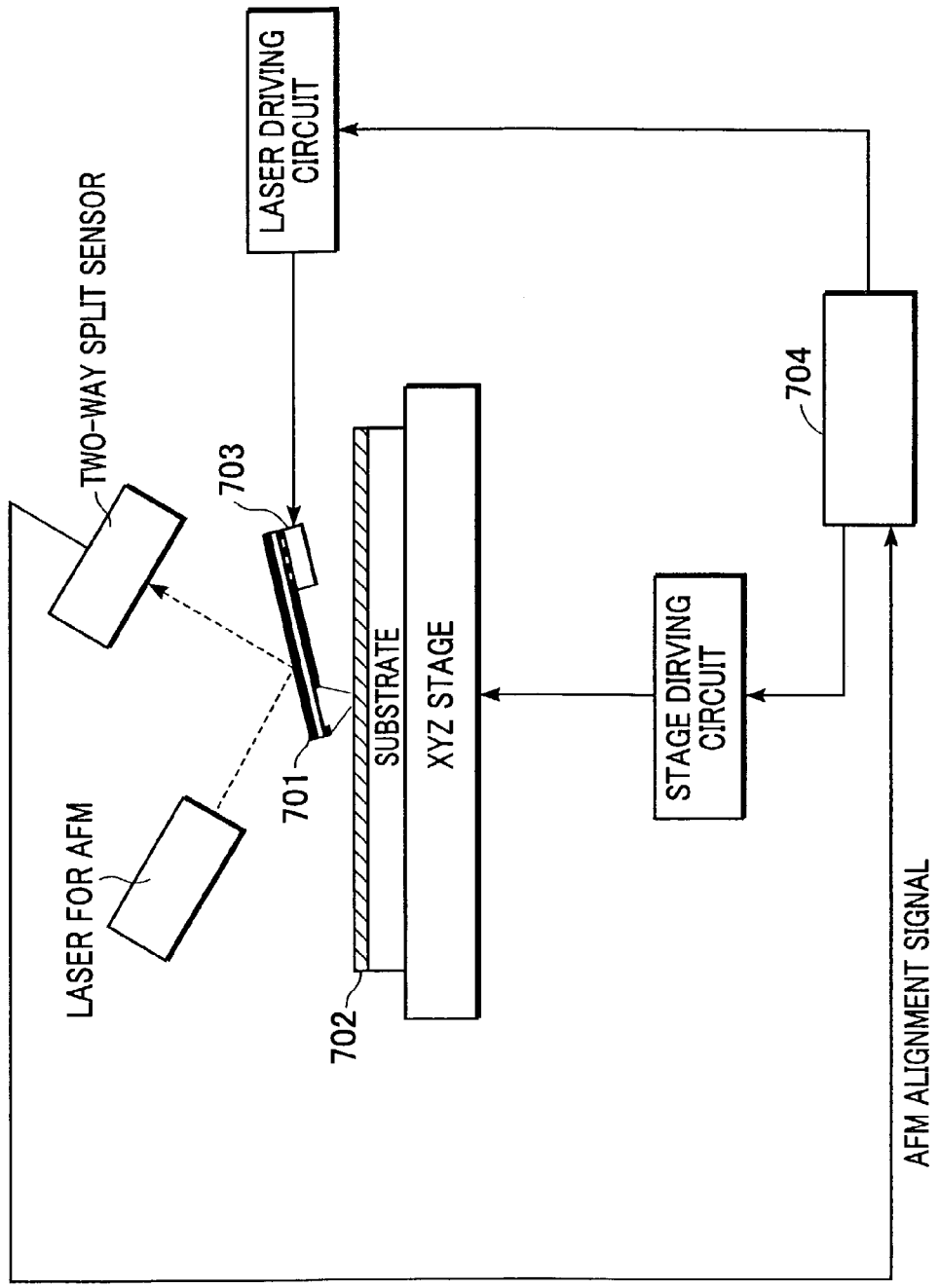

FIG. 8A
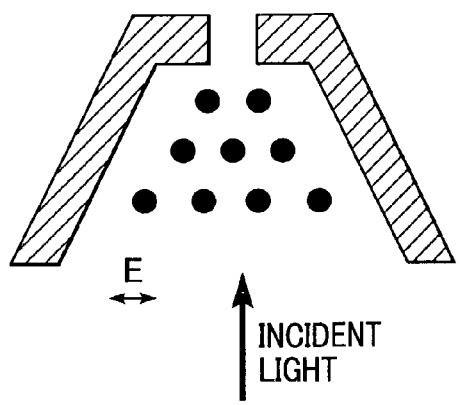
DIRECTION OF POLARIZATION:
PARALLEL TO PAPER SURFACE
(case : A)
FIG. 8B
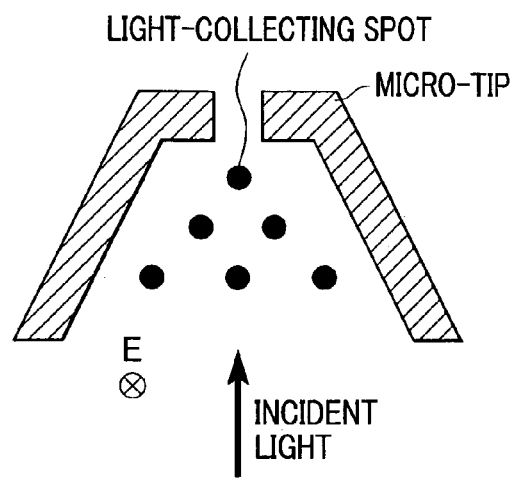
LIGHT-COLLECTING SPOT
MICRO-TIP
DIRECTION OF POLARIZATION:
PERPENDICULAR TO PAPER
SURFACE (case : B)
FIG. 9
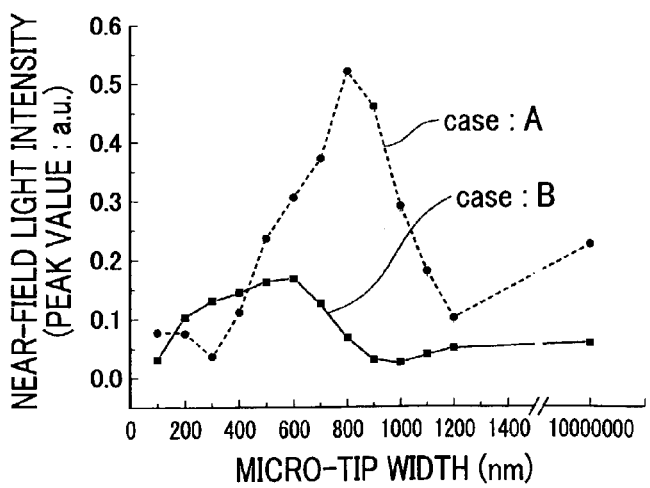
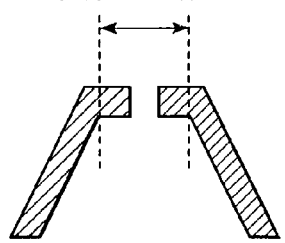

TOP IS SUPPORTED
BY INCLINED SURFACE

TOP IS SUPPORTED
BY VERTICAL SURFACE

PROBE, NEAR-FIELD LIGHT GENERATION APPARATUS INCLUDING PROBE, EXPOSURE APPARATUS, AND EXPOSING METHOD USING PROBE

BACKGROUND OF THE INVENTION

1. Field of the Invention

The present invention relates to a micro-tip for near-field light, a method for generating near-field light by using the micro-tip, a probe including the micro-tip, a storage apparatus including the probe, a surface observation apparatus, an exposure apparatus, a method for manufacturing a device and a method for manufacturing a probe including the micro-tip for near-field light.

2. Description of the Related Art

Recently, a scanning tunneling microscope (hereafter referred to as 'STM') capable of directly observing the electron structure of surface atoms of a conductor was developed (G. Binning et al., Phys. Rev. Lett., 49, 57 (1983)), and thereby, a real space image was able to be measured with high resolution regardless of single crystal or amorphous substance. Since then, considerable researches have been done on scanning probe microscopes (hereafter referred to as 'SPMs') in the field of evaluation of microstructures of materials.

Examples of SPMs include, for example, scanning tunneling microscopes (STMs), atomic force microscopes (AFMs), magnetic force microscopes (MFMs) and scanning near-field optical microscopes (SNOMs), in which surface structures are detected using a tunneling current, an interatomic force, a magnetic force, light and the like attained by bringing a probe including a micro-tip close to a specimen to be evaluated. The SNOM is a type of SPM, and performs a measurement through the use of near-field light generated from a micro-aperture with a resolution of $\lambda/2$ or less which has been considered to be impossible to achieve with respect to conventional optical microscopes. Consequently, fine pattern shapes of specimen surfaces and the like are non-destructively measured with high resolution. Furthermore, since the SNOM can use specimens of living bodies, cells and other materials which were conventionally difficult to be observed, various types of subject can be observed, and therefore, the SNOM is applied in wide areas.

A sharp micro-tip was proposed for generating near-field light in Japanese Patent Laid-Open No. 10-293134. However, in the case where near-field light is generated using a micro-aperture provided at the tip of the sharp micro-tip, when the aperture diameter of the above-mentioned micro-aperture is decreased to improve the resolution, the efficiency of generation of the near-field light is reduced. Therefore, further improvement of the efficiency of generation is required. When the tip is sharpened, prevention of deformation in the shape of the micro-tip during the manufacturing process and during use is also required.

SUMMARY OF THE INVENTION

It is an object of the present invention to overcome the above-mentioned problems, and to provide a micro-tip for near-field light, which can generate near-field light with high efficiency and which is unlikely to deform during the manufacturing process, during use or the like, a method for generating near-field light by using the micro-tip, a probe including the micro-tip, a storage apparatus including the probe, a surface observation apparatus, an exposure apparatus, a method for manufacturing a device and a method for manufacturing a probe including the micro-tip for near-field light.

In order to achieve the above-mentioned objects, according to an aspect of the present invention, a prove which generates near-field light from an aperture at the tip is provided, wherein the tip is covered with a lightproof member, at least the interior of the lightproof member is in the shape of a cone having a plane-shaped top, and the above-mentioned aperture is provided in the top plane.

Preferably, the above-mentioned top plane passes through the vicinity of an electric-field-collecting point nearest the apex of the cone in the interior of the cone. Preferably, the above-mentioned aperture is provided in the location including an electric-field-collecting point. In a preferable mode of the prove, the above-mentioned cone is a rectangular pyramid, or the exterior of the top is also in the shape of a plane.

According to another aspect of the present invention, a near-field light generation apparatus is provided. This apparatus includes the probe according to the above-mentioned aspect and a light source device which applies light to the probe in order that an electric-field-collecting point nearest the apex of the cone is generated in the vicinity of the top plane in the interior of the cone.

According to another aspect of the present invention, a near-field light exposure apparatus is provided. This apparatus includes the probe according to the above-mentioned aspect, a light source device which applies light to the probe in order that an electric-field-collecting point nearest the apex of the cone is generated in the vicinity of the top plane in the interior of the cone, and a scanning device to perform scanning with the probe.

Further objects, features and advantages of the present invention will become apparent from the following description of the preferred embodiments with reference to the attached drawings.

BRIEF DESCRIPTION OF THE DRAWINGS

FIGS. 2A to 2H are diagrams showing a method for manufacturing a probe in an embodiment and Example 1 of the present invention.

FIG. 7 is a diagram schematically showing the configuration in which a near-field light probe is applied to a fine processing apparatus in Example 7 of the present invention.

FIGS. 8A and 8B are schematic diagrams for illustrating that light-collecting spots based on reflection at an inner surface of a micro-tip are changed depending on polarized light incident into the micro-tip.

FIG. 9 is a diagram showing an example of the intensity of the near-field light generated relative to the micro-tip width.

DESCRIPTION OF THE PREFERRED EMBODIMENTS

When the above-mentioned configuration is applied, in particular, the top of a cone-shaped micro-tip is composed of a plane in order to detect or apply near-field light, and a through hole is provided at the top, a high generation efficiency of near-field light can be achieved. When the interior of the micro-tip is in the shape of a cone, incident light is reflected at the inner surface, and light-collecting spots are spatially generated due to interference and collection in the interior of the micro-tip. Therefore, the top of the interior of the micro-tip is not made into the shape of a sharp cone but made into the shape of a plane, the locations of the light-collecting spots due to the inner surface reflection are changed, the location of a micro-aperture provided at the tip of the micro-tip for generating near-field light is arranged in the vicinity of the above-mentioned light-collecting spots, and thereby, high generation efficiency of near-field light can be achieved.

It is also made clear that the locations of generation of the above-mentioned light-collecting spots vary depending on not only the shape of the micro-tip, but also the polarization direction of the light incident into the micro-tip. Consequently, both of the shape of the interior of the micro-tip and the polarization direction of the light incident into the micro-tip must be taken into consideration for generation of near-field light with high efficiency. FIGS. 8A and 8B are schematic diagrams showing change in the locations of light-collecting spots depending on the polarization direction when light enters into a micro-tip in the shape of a quadrangular pyramid. FIGS. 8A and 8B show electric field strengths in cross sections parallel (FIG. 8A) and perpendicular (FIG. 8B), respectively, to the direction of the electric field of the incident light when a plane wave enters into the probe of the present invention from directly below. The light reflected at the inner surface of the cone causes interference, and as a result, spots, at which light is collected and thereby is enhanced, are generated in the interior of the cone. Black circles shown in FIGS. 8A and 8B indicate the regions thereof. The number of spots decreases as the apex of the cone approaches, and no spot is generated in close vicinity to the apex. In a conventional near-field generation probe, the aperture is provided at the apex of the cone, and is at a distance from these spots. Consequently, the near-field light generated outside the aperture has a reduced intensity. In the present invention, the top of the cone is composed of a plane, and the plane is arranged in the vicinity of the location of this spot. As a result, the aperture is provided in the vicinity of the center of the spot or in the location including the center of the spot, and thereby, the intensity of the near-field light generated from the aperture toward the outside is increased.

Figure 12:
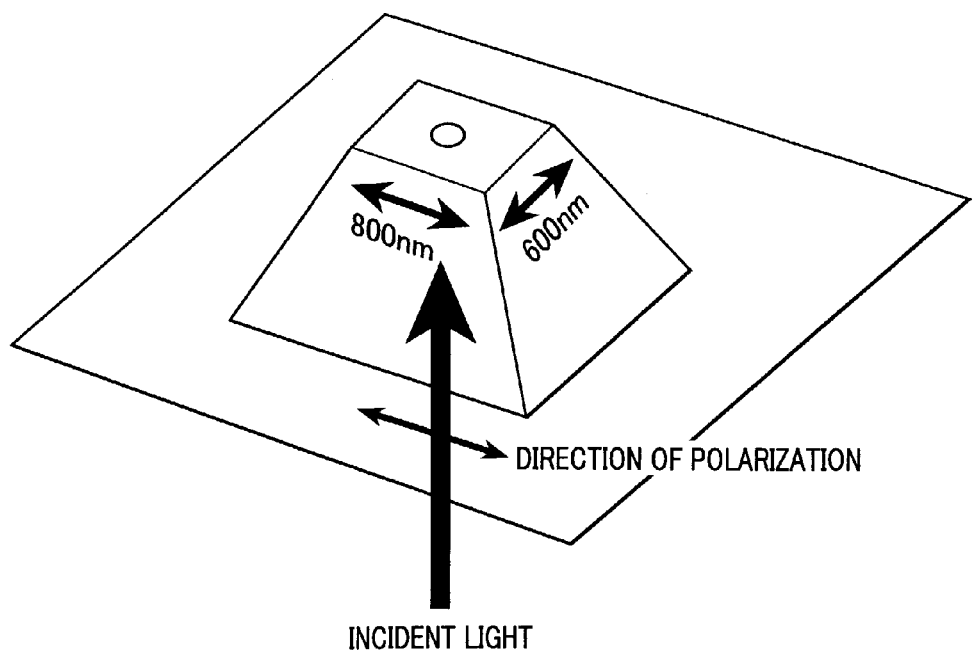
FIG. 12 is a schematic diagram for illustrating a highly efficient micro-tip in an embodiment of the present invention.

FIG. 9 shows an example in which the intensity of the near-field light generated varies with change in the size of the top plane of the interior of the micro-tip. That is, desirably, the shape of the interior of the micro-tip is made to be a rectangular pyramid in which the top is composed of a plane (refer to FIG. 12) while the size of the top is determined in consideration of the polarization direction of the incident light (in this example, when the wavelength of the incident light is 500 nm, and the material of the micro-tip is gold (Au), the top is in the shape of a rectangle in the order of 600 nm×800 nm). Numerical calculations show that the intensity of the near-field light generated under this optimum condition may be enhanced to about 40 times larger than that of the micro-tip having the interior in a sharpened shape. Furthermore, since sufficient effect of enhancing the near-field light can be expected even when there is an error in the order of 100 nm on a side basis with respect to the size of the rectangular top, an error in the order of 100 nm is acceptable with respect to the error in patterning, the error in the depth direction of etching and the like.

Figure 10A:
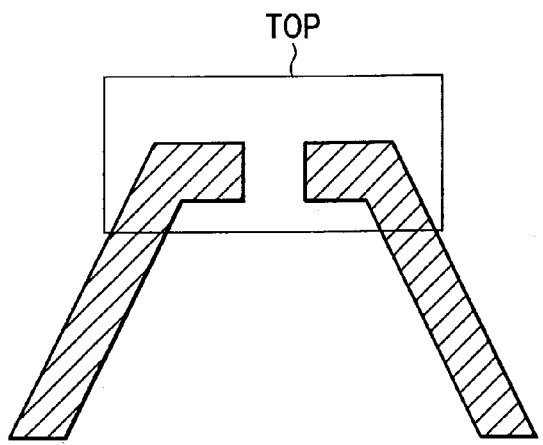
FIGS. 10A and 10B are diagrams for illustrating examples of manners in which the top of a micro-tip is supported in an embodiment of the present invention.
Figure 10B:
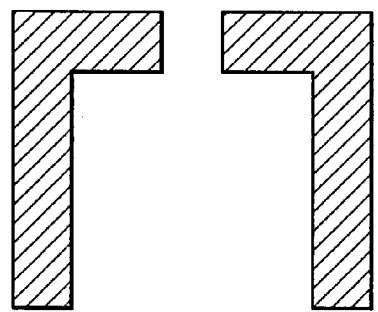

When the top of the exterior of the micro-tip is made to be flat in addition to the top of the interior of the micro-tip, a load applied to the top on a unit area basis is reduced in the case where the micro-tip is brought into contact with a specimen during the use of the micro-tip. Consequently, even when the micro-tip is brought into contact with a specimen to be observed or a subject to be processed, deformation of the micro-tip itself can be prevented. Furthermore, there is an effect of preventing breakage of the subject to be observed. When the plane portion of the top is supported by an inclined surface of the cone in a manner shown in FIG. 10A, the strength against a force applied to the micro-tip in the horizontal direction can be improved compared with that of the shape shown in FIG. 10B.

According to the probe constructed from the above-mentioned micro-tip, a surface observation apparatus having an improved speed of surface observation or information processing equipment capable of reducing a time for recording can be realized.

An exposure apparatus capable of forming a fine pattern at a high speed can be provided using the probe constructed from the above-mentioned micro-tip. Furthermore, a miniaturized, large-capacity optical memory can be realized by constructing a multi-probe from this probe.

According to the above-mentioned method for manufacturing a probe, by using semiconductor processing techniques, e.g., in particular, thermal oxidation of a silicon substrate and thin film formation with a vacuum apparatus, and by making into an appropriate shape in accordance with the use, a method for manufacturing a probe including a micro-tip with a micro-aperture can be realized, in which a micro-tip capable of generating near-field light with high efficiency can be formed with excellent reproducibility, and deformation of the micro-tip shape can be reduced during the manufacturing process. According to the above-mentioned method for manufacturing a probe, the yield is increased, and a micro-tip can be prepared in a short time.

A method for manufacturing a micro-tip including a micro-aperture of the present invention will be described with reference to FIGS. 2A to 2H.

A concave portion 3 is formed by crystal axis anisotropic etching on the surface of a first substrate 2 with surface orientation (100). At this time, the bottom of the concave portion 3 is not pointed, but is formed into the shape of a plane. Preferably, not all planes are made to be the (100) plane by etching, and etching is stopped at some midpoint condition when the concave portion is formed in the substrate by crystal axis anisotropic etching. Subsequently, a thermal oxidation film is formed on the surface of the concave portion 3. This thermal oxidation film has a function as a releasing layer 4.

A first lightproof layer 5 is deposited on the surface of the first substrate 2 with a vacuum film formation apparatus (refer to FIG. 2C). The resulting first lightproof layer 5 is patterned into a desired shape by using techniques of photolithography and etching.

A subject, to which the above-mentioned first lightproof layer 5 is transferred, is prepared, and on an as needed basis, a bonding layer for smoothing the way to join the first lightproof layer 5 and a second substrate 6 is formed on the second substrate 6 or on the subject to which the transfer is performed. For example, when transfer is performed to an elastic subject, e.g. a cantilever, an AFM/SNOM combination probe can be produced.

The first lightproof layer 5 on the releasing layer 4 is joined to the second substrate 6 or a third lightproof layer 11 on the second substrate 6. In order to perform this, an alignment apparatus capable of holding each substrate with a vacuum chuck and the like is used. The first substrate 2 and the second substrate 6 are aligned, and are brought into contact while facing each other. Subsequently, a load is applied, so that the first lightproof layer 5 and the second substrate 6 or the third lightproof layer 11 on the second substrate 6 are joined (pressure-bonded).

Peeling is performed at the interface between the releasing layer 4 and the first lightproof layer 5, and therefore, the first lightproof layer 5 is transferred onto the second substrate 6 or the third lightproof layer 11 on the second substrate 6. That is, peeling is performed at the interface between the releasing layer 4 and the first lightproof layer 5 by separating the first substrate 2 and the second substrate 6 (refer to FIG. 2G).

A micro-aperture having a diameter of 100 nm or less is formed at the top of the micro-tip with a focused ion beam processing apparatus. In the above-mentioned example, the micro-tip was used after being pressure-bonded to another substrate. However, as another method for use, it can be considered that the micro-tip is used without being pressure-bonded to another substrate. A method for manufacturing a micro-tip suitable for such a use will be described below.

A concave portion having a flat bottom is formed on a Si substrate by using anisotropic etching. An etching-stop layer is formed on this concave portion, and back etching is performed from the reverse surface of the substrate by a technique of anisotropic etching and the like. At this time, etching is performed until the top of the concave portion is exposed. A micro-aperture is formed on the top of this exposed concave portion with a focused ion beam processing apparatus. A lightproof layer is formed on the substrate surface and therefore, a micro-tip is completed.

According to the present invention, it is possible to realize a micro-tip for near-field light, which can generate near-field light with high efficiency and which is unlikely to deform during the manufacturing process, during use or the like, a method for generating near-field light by using the micro-tip, a probe including the micro-tip, a storage apparatus including the probe, a surface observation apparatus, an exposure apparatus, a method for manufacturing a device and a method for manufacturing a probe including the micro-tip for near-field light.

A surface observation apparatus having an improved speed of surface observation or information processing equipment capable of reducing a time for recording can be realized by using the probe including the micro-tip of the present invention. An exposure apparatus capable of forming a fine pattern at a high speed can be provided. Furthermore, a miniaturized, large-capacity optical memory can be realized by constructing a multi-probe using this probe.

According to the method for manufacturing a probe of the present invention, a method for manufacturing a probe including a micro-tip with a micro-aperture can be realized, in which a micro-tip capable of generating near-field light with high efficiency can be formed with excellent reproducibility, and deformation of the micro-tip shape can be reduced during the manufacturing process.

Examples of the present invention will be described below.

EXAMPLE 1

Example 1 of the present invention relates to a method for manufacturing a micro-tip constructed from a cone-shaped member with the top composed of a plane, the member having a through hole, and a probe including the micro-tip.

Figure 1:
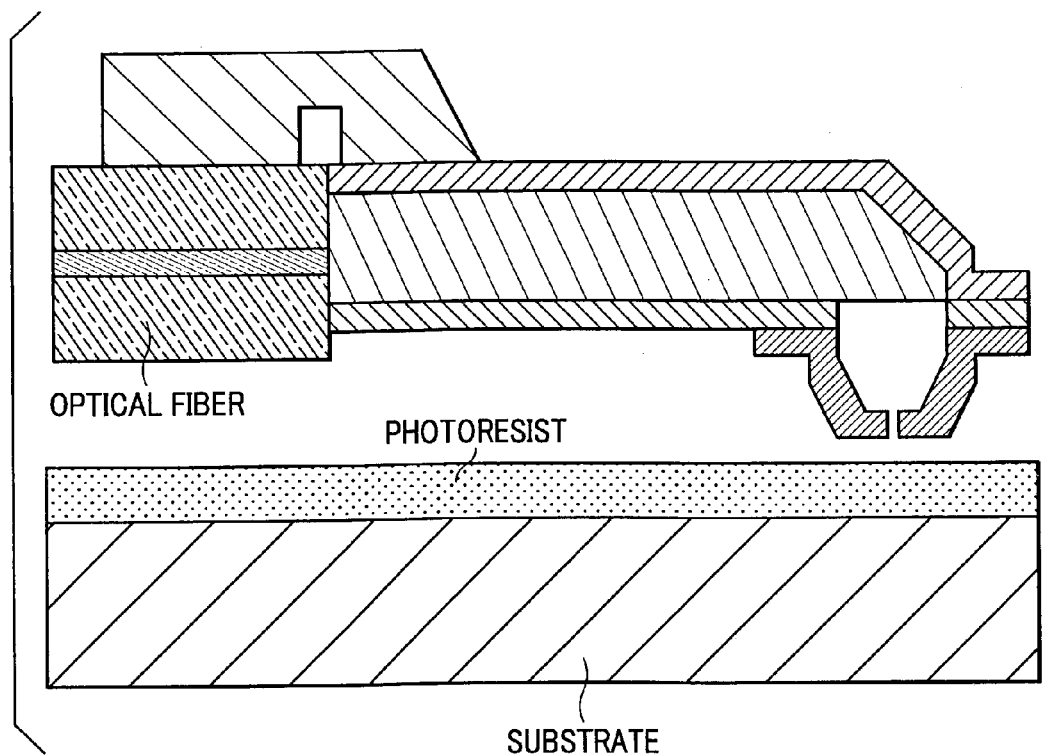
FIG. 1 is a diagram showing an example of the use of a probe according to the present invention.

A method for using the micro-tip according to the present Example is shown in, for example, FIG. 1, in which light is introduced directly or via an optical element, e.g. an optical fiber, from an end surface of a waveguide layer supporting the micro-tip, a photoresist is brought within such a range that evanescent light emitted from the micro-aperture can reach, and thereby, exposure of a fine pattern is performed.

FIGS. 2A to 2H are sectional views showing a manufacturing process of a micro-tip for applying evanescent light according to the present Example. The method for manufacturing the probe will be described below with reference to these drawings.

A single crystal silicon wafer with surface orientation (100) was prepared as a first substrate 2, and 100 nm of silicon thermal oxidation film was formed as a protective layer 1. A desired portion of the protective layer 1 on the surface was patterned by photolithography and etching with an aqueous solution of hydrogen fluoride and ammonium fluoride, so that rectangular silicon having two sides of 5 μm and 5.2 μm, respectively, was exposed.

Silicon of the patterned portion was etched for 10 minutes by crystal axis anisotropic etching using a potassium hydroxide aqueous solution having a concentration of 30% at a liquid temperature of 90° C. Through this step, a concave portion 3 of about 3 μm depth in the shape of an inverted pyramid having a flat bottom was formed (refer to FIG. 2B), while the concave portion was enclosed with four surfaces equivalent to the (111) plane and the bottom was composed of the (100) plane. At this time, the angle between each of the four surfaces of the concave portion 3 and the surface of the first substrate 2 was determined by a crystal orientation, and was about 55°.

The protective layer 1 was removed with an aqueous solution of hydrogen fluoride and ammonium fluoride, and thereafter, thermal oxidation was performed using a mixed gas of hydrogen and oxygen at 1000° C. so that 200 nm of silicon dioxide was deposited as a releasing layer 4. Gold (Au) and platinum (Pt) were simultaneously deposited on the first substrate 2 by a vacuum evaporation method, and the thickness thereof was 100 nm. 50 nm of platinum (Pt) was further deposited by the vacuum evaporation method. Finally, 300 nm of gold (Au) was further deposited by the vacuum evaporation method. These three layers were specified to be a first lightproof layer 5. The first lightproof layer 5 was patterned by photolithography and etching (refer to FIG. 2C).

A single crystal silicon wafer with surface orientation (100) was prepared as a second substrate 6, and 250 nm of silicon nitride film was formed as mask layers 7 on both surfaces of the second substrate 6 (refer to FIG. 2D).

The mask layer 7 on the surface was subjected to photolithography, so that rectangular silicon of 5 µm width and 1 mm length was exposed. At this time, the rectangle was prepared to form an angle of 45 degrees relative to the orientation flat.

A mixed solution of a TMAH (22%) solution and a surfactant NCW601 (0.5%) was heated to 90 degrees, and the substrate was subjected to crystal axis anisotropic etching for 10 minutes. As a result, a V-channel 8 of about 5 µm width and about 2 µm depth having a flat bottom was formed. The silicon nitride film jutting out over the V-channel 8 was removed by photolithography and dry etching. Subsequently, 5 nm of titanium (Ti) was deposited by the vacuum evaporation method. 100 nm of gold (Au) was further deposited by the vacuum evaporation method. Finally, 50 nm of platinum (Pt) was deposited by the vacuum evaporation method. These three layers were collectively specified to be a second lightproof layer 9 (refer to FIG. 2E).

SU8 was applied as a waveguide layer 10, followed by patterning. 50 nm of platinum (Pt) was deposited by the vacuum evaporation method. 100 nm of gold (Au) was further deposited by the vacuum evaporation method. These two layers were specified to be a third lightproof layer 11. The second lightproof layer 9 and the third lightproof layer 11 were patterned by photolithography and etching (refer to FIG. 2F).

Figure 2G:
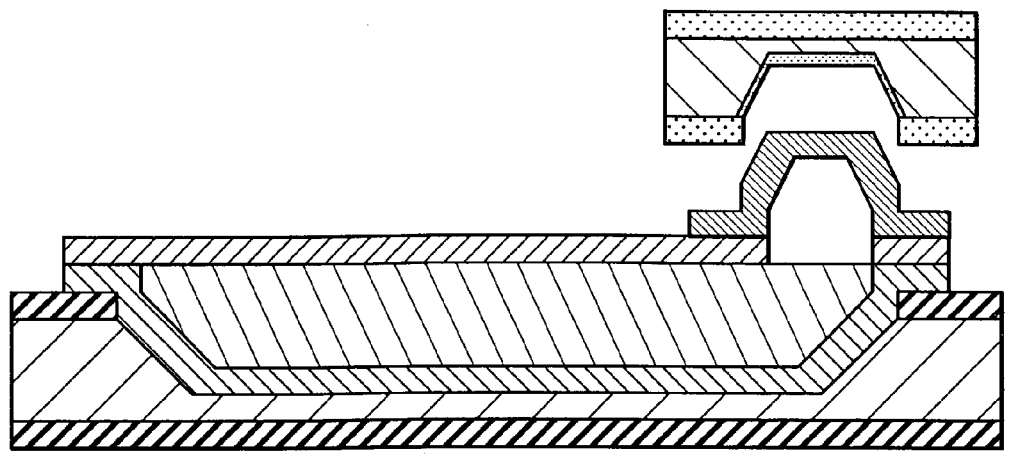
Figure 2H:
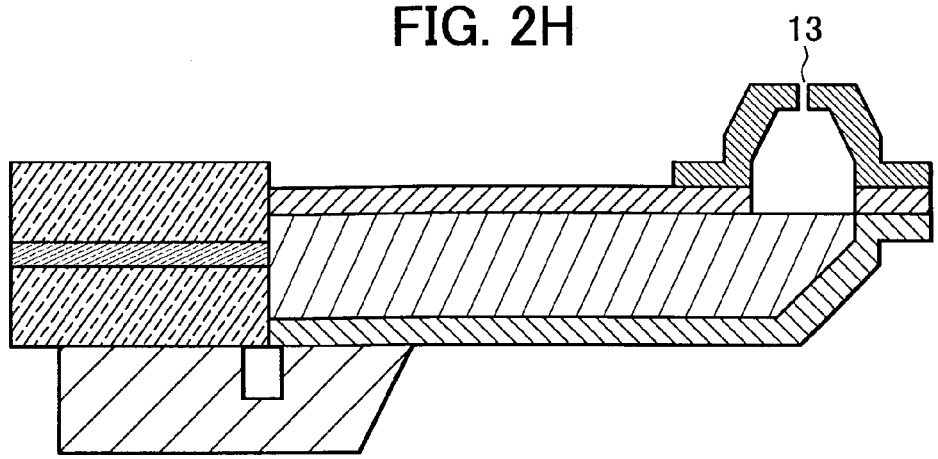

The first lightproof layer 5 arranged on the first substrate 2 after completion of the treatment and the third lightproof layer 11 of the second substrate 6 were pressure-bonded while the center of the concave portion 3 of the first substrate 2 and the center of the aperture 12 patterned on the third lightproof layer 11 of the second substrate 6 were adjusted to be on the same axis (refer to FIG. 2G).

By the pressure-bonding, the first lightproof layer 5, which had been arranged on the first substrate 2, was transferred onto the third lightproof layer 11 (aperture 12) on the second substrate 6 (refer to FIG. 2G).

A micro-aperture 13 was formed at the top of the first lightproof layer 5 with a focused ion beam apparatus. In this manner, a micro-tip including a micro-aperture at the tip was prepared. Subsequently, a conversion treatment into a lever was performed (refer to FIG. 2H).

The light propagated through the waveguide layer in the second substrate during the use, and when reached the underneath of the micro-tip, the light was reflected upward at the 45-degree-mirror portion composed of the (110) plane of the end surface of the waveguide layer, and was introduced into the micro-tip.

When the probe according to the process shown in the present Example was compared with a probe according to a conventional method for formation, it was verified that the intensity of the near-field light generated from the tip of the micro-tip was increased because of an effect of the micro-tip shape determined in consideration of the polarization direction of the light incident into the micro-tip, an effect of inner surface reflection of the light in the micro-tip, and the like, regarding the probe of the present Example.

The shape of the micro-aperture at the tip of the micro-tip in the present Example is not limited to the shape of a circle.

In a surface observation apparatus including the probe using the micro-tip according to the present Example, a high-resolution SNOM image was able to be produced with high throughput.

It was verified that a diffraction grating prepared by an exposure apparatus equipped with the probe using the micro-tip according to the present Example had a grating pitch of 100 nm or less. Since the tip of the micro-tip was composed of a plane, the risk of folding of the tip of the micro-tip during the process was reduced, and therefore, the yield of the total process was increased. The probe in the present Example may be used as a multi-probe in place of a single probe.

EXAMPLE 2

Example 2 of the present invention relates to a method for manufacturing a micro-tip constructed from a cone-shaped member with the top composed of a plane, the member having a through hole.

FIGS. 3A to 3D are sectional views showing a manufacturing process of a micro-tip according to the present Example. The method for manufacturing the micro-tip will be described below with reference to these drawings.

Figure 3A:
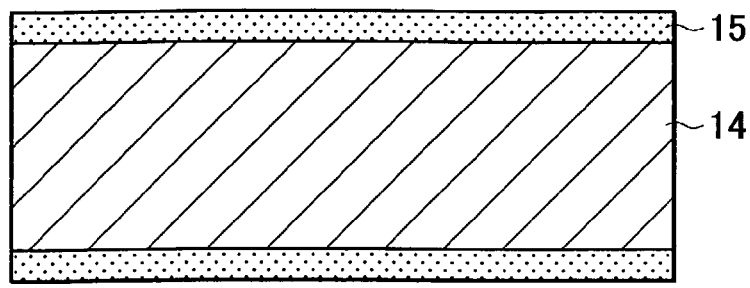
FIGS. 3A to 3D are diagrams showing a method for manufacturing a micro-tip in Example 2 of the present invention.
Figure 3B:
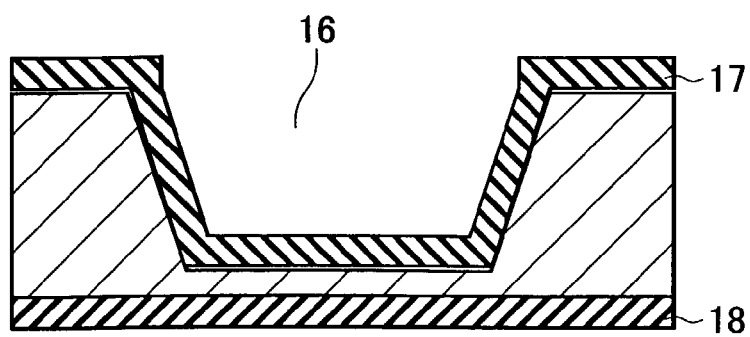
Figure 3C:
Figure 3D:
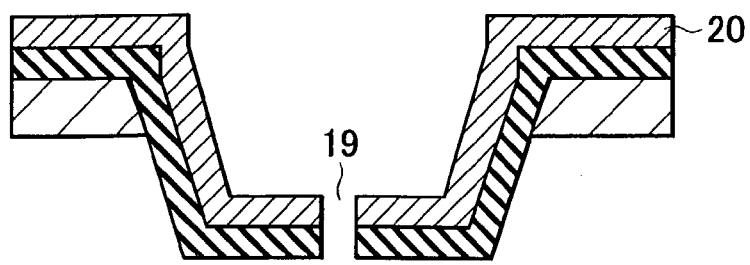

A substrate 14 made of a single crystal silicon wafer with surface orientation (100) was prepared, and 100 nm of silicon thermal oxidation film was formed as a protective layer 15 (refer to FIG. 3A).

A desired portion of the protective layer 15 was patterned by photolithography and etching with hydrogen fluoride and ammonium fluoride, so that silicon of 5 µm width and 5.2 µm length was exposed.

Silicon of the patterned portion was etched by crystal axis anisotropic etching using a potassium hydroxide aqueous solution having a concentration of 30% at a liquid temperature of 90° C. Through this step, a concave portion 16 of about 3 µm depth in the shape of an inverted pyramid having a flat bottom was formed, while the concave portion was enclosed with four surfaces equivalent to the (111) plane and the bottom was composed of the (100) plane. The protective layer 15 was removed with an aqueous solution of hydrogen fluoride and ammonium fluoride, and thereafter, 200 nm of silicon nitride films were formed as a reverse surface mask layer 18 and an etching-stop layer 17 by a low-pressure chemical vapor deposition method (refer to FIG. 3B).

A desired portion of the reverse surface mask layer 18 was patterned by photolithography and dry etching with carbon tetrafluoride, so that a part of silicon was exposed. Subsequently, silicon of the patterned portion was etched by crystal axis anisotropic etching using a potassium hydroxide aqueous solution having a concentration of 30% at a liquid temperature of 110° C. In this step, etching was performed until the top of the etching-stop layer 17 of the concave portion 16 was exposed (refer to FIG. 3C).

A micro-aperture 19 was formed at the top of the etching-stop layer 17 by using a focused ion beam processing apparatus. At this time, a focused ion beam is applied from the side corresponding to the interior of the micro-tip. Subsequently, 100 nm of gold (Au) was deposited by the vacuum evaporation method from the surface of the substrate 14. This layer was specified to be a lightproof layer 20 (refer to FIG. 3D).

When the micro-tip according to the process shown in the present Example was compared with a micro-tip according to a conventional method for formation, it was verified that the intensity of the near-field light generated from the tip of the micro-tip was increased because of an effect of the micro-tip shape determined in consideration of the polarization direction of the light incident into the micro-tip, an effect of inner surface reflection of the light in the micro-tip, and the like, regarding the micro-tip of the present Example.

The shape of the micro-aperture at the tip of the micro-tip in the present Example is not limited to the shape of a circle.

In a surface observation apparatus including the probe using the micro-tip according to the present Example, a high-resolution SNOM image was able to be produced with high throughput. It was verified that a diffraction grating prepared by an exposure apparatus equipped with the probe using the micro-tip according to the present Example had a grating pitch of 100 nm or less.

Figure 13:
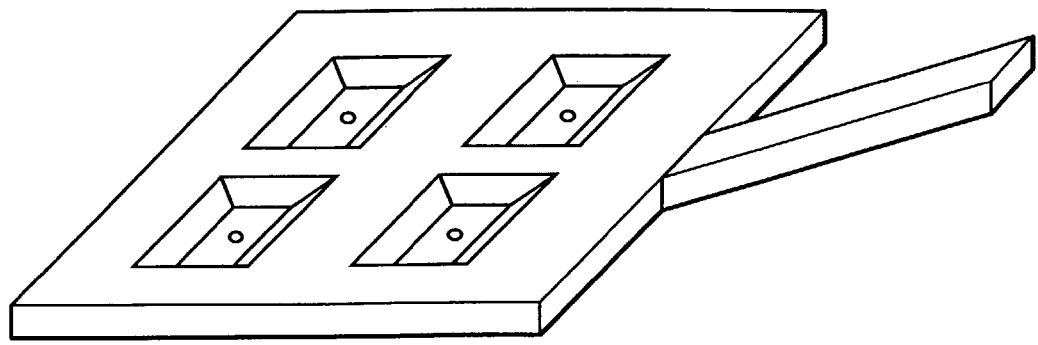
FIG. 13 is a schematic diagram showing an example of the configuration of a multi-micro-tip according to the micro-tip in Example of the present invention.

Since the tip of the micro-tip was composed of a plane, the risk of folding of the tip of the micro-tip during the process was reduced, and therefore, the yield of the total process was increased. Since the micro-tip was used alone without combination with a waveguide, no pressure-bonding step of the micro-tip to the waveguide was required. This contributed to the improvement of the yield as well. This micro-tip may be used as a multi-micro-tip in place of a single micro-tip (FIG. 13). When light is entered into the multi-micro-tip, and near-field light is generated from the micro-aperture provided at the tip thereof so as to be put into use, the incident light for generating the near-field light may be the light which collectively illuminates all the micro-tips, or the intensity of the incident light may be changed on a micro-tip basis through a spatial light modulation element and the like.

EXAMPLE 3

Figure 11A:
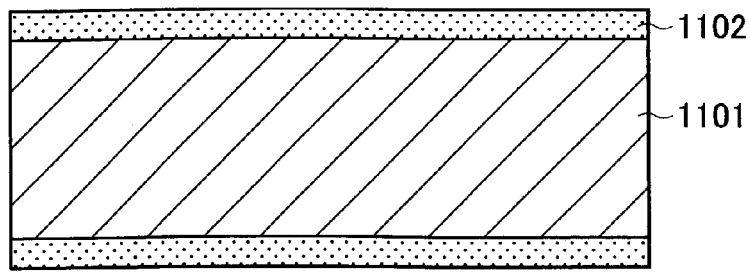
FIGS. 11A to 11C are diagrams schematically showing a method for manufacturing a micro-tip in Example 3 of the present invention.
Figure 11B:
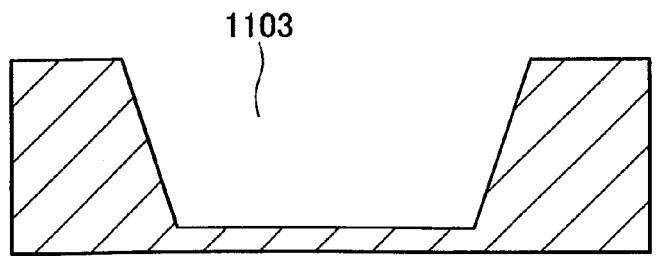
Figure 11C:
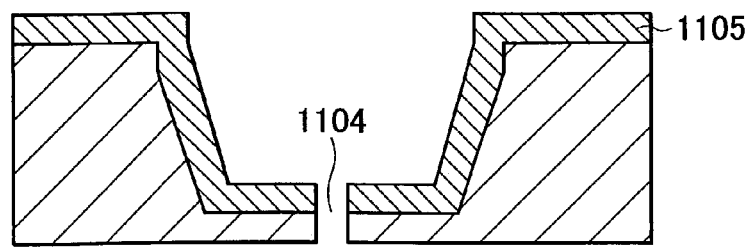

FIGS. 11A to 11C are diagrams showing a method for manufacturing a micro-tip constructed from a cone-shaped member with the top composed of a plane, the member having a through hole, in Example 3 of the present invention.

The method for manufacturing the micro-tip of the present Example will be described with reference to FIGS. 11A to 11C. A substrate 1101 made of a single crystal silicon wafer (thickness in the order of 10 µm) with surface orientation (100) was prepared, and 200 nm of silicon thermal oxidation film was formed as a protective layer 1102 (refer to FIG. 11A).

A desired portion of the protective layer 1102 was patterned by photolithography and etching with hydrogen fluoride and ammonium fluoride, so that silicon of 13.6 µm width and 13.8 µm length was exposed.

Silicon of the patterned portion was etched by crystal axis anisotropic etching using a potassium hydroxide aqueous solution having a concentration of 30% at a liquid temperature of 90° C. Through this step, a concave portion 1103 of about 9.7 µm depth in the shape of an inverted pyramid having a flat bottom was formed, while the concave portion was enclosed with four surfaces equivalent to the (111) plane and the bottom was composed of the (100) plane.

The protective layer 1102 was removed with an aqueous solution of hydrogen fluoride and ammonium fluoride (refer to FIG. 11B).

A micro-aperture 1104 was formed at the top of the concave portion 1103 by using a focused ion beam processing apparatus. At this time, a focused ion beam was applied from the side corresponding to the interior of the micro-tip of the concave portion 1103. Subsequently, 50 nm of titanium (Ti) and 100 nm of gold (Au) was deposited by the vacuum evaporation method from the surface of the substrate 1101, and these were specified to be a lightproof layer 1105 (refer to FIG. 11C).

When the micro-tip according to the process shown in the present Example was compared with a micro-tip according to a conventional method for formation, it was verified that the intensity of the near-field light generated from the tip of the micro-tip was increased because of an effect of the micro-tip shape determined in consideration of the polarization direction of the light incident into the micro-tip, an effect of inner surface reflection of the light in the micro-tip, and the like, regarding the micro-tip of the present Example. Since the tip of the micro-tip was composed of a plane, the risk of folding of the tip of the micro-tip during the process was reduced, and therefore, the yield of the total process was increased. Since the micro-tip was used alone without combination with a waveguide, no pressure-bonding step of the micro-tip to the waveguide was required. This contributed to the improvement of the yield as well. This micro-tip may be used as a multi-micro-tip in place of a single micro-tip.

EXAMPLE 4

Figure 4:
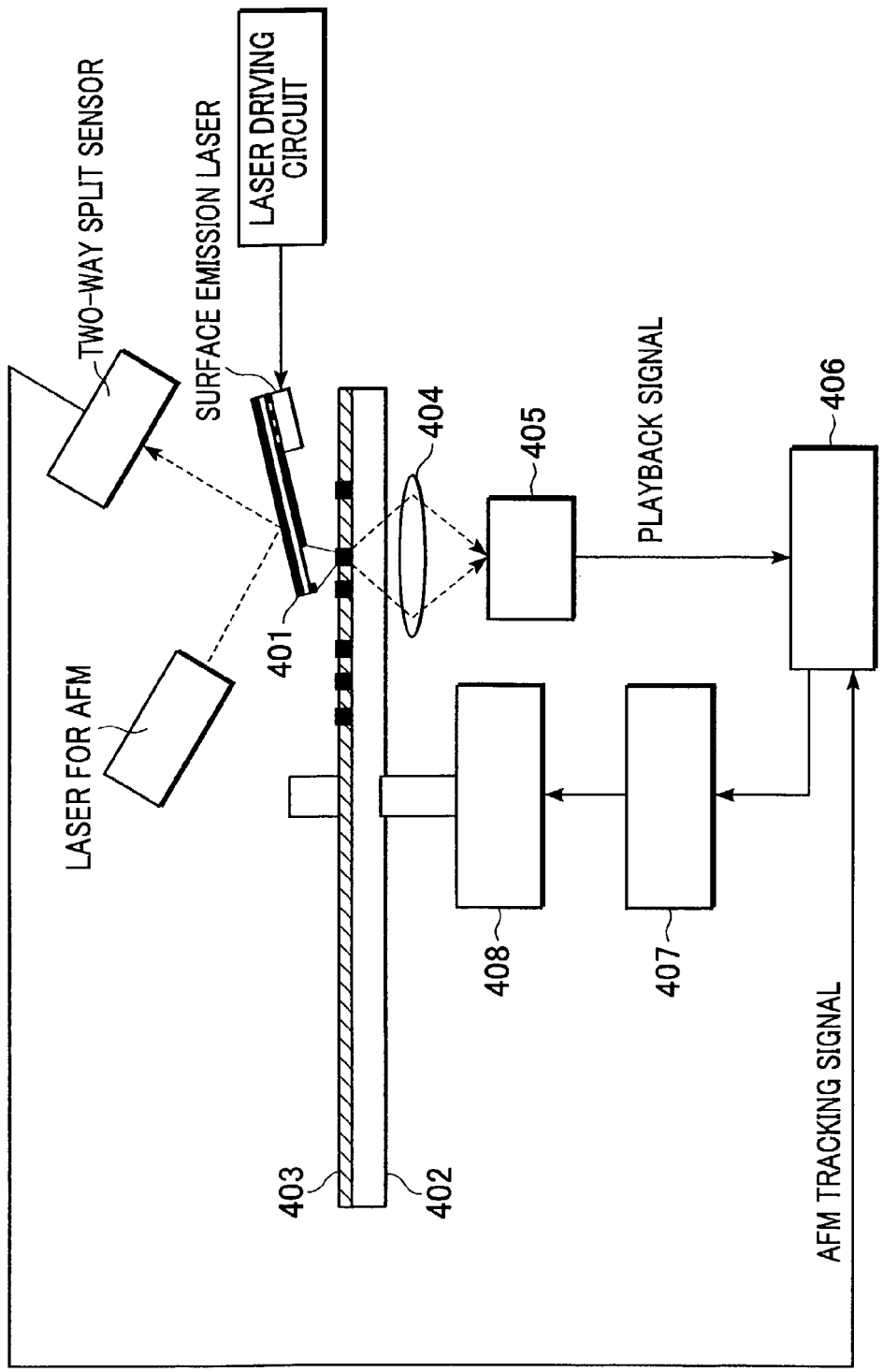
FIG. 4 is a diagram schematically showing the configuration in which a near-field light probe is applied to a storage apparatus in Example 4 of the present invention.

FIG. 4 is a diagram showing the configuration in which the near-field light probe is applied to a storage apparatus in Example 4 of the present invention.

As shown in FIG. 4, in a manner similar to that in the above-mentioned SNOM in the illumination mode, near-field light generated from the micro-aperture at the tip of a near-field light probe 401 is applied to a recording medium 403 on a substrate 402 so as to perform recording and playback. Recording is performed using near-field light having high intensity generated by increasing the intensity of the laser light. Near-field light having low intensity generated by decreasing the intensity of the laser light is applied to the recording medium 403, scattered, transmitted light thereof is collected with a condenser lens 404, and the intensity is detected with an avalanche photodiode 405, so that a playback signal is produced, and is input into a recording and playback control computer 406.

The recording and playback control computer 406 drives a rotation motor 408 via a rotation motor driving circuit 407, so that the recording medium 403 is rotated relative to the near-field light probe 401. An AFM signal produced in a manner similar to that in the above-mentioned SNOM in the illumination mode is input into the recording and playback control computer 406 as a control signal for tracking, and is used for aligning the recording medium 403 with respect to the near-field light probe 401.

Since the storage apparatus was constructed using the near-field light probe of the present invention, even when scanning was performed while a probe tip was in contact with a soft recording medium, e.g. an organic material, stable recording and playback was able to be performed without damaging the recording medium surface, because the top of the exterior of the micro-tip was flat, and without damaging the micro-tip itself. Furthermore, recording and playback of information was able to be performed in a short time because the near-field light was generated with high efficiency.

EXAMPLE 5

Figure 5:
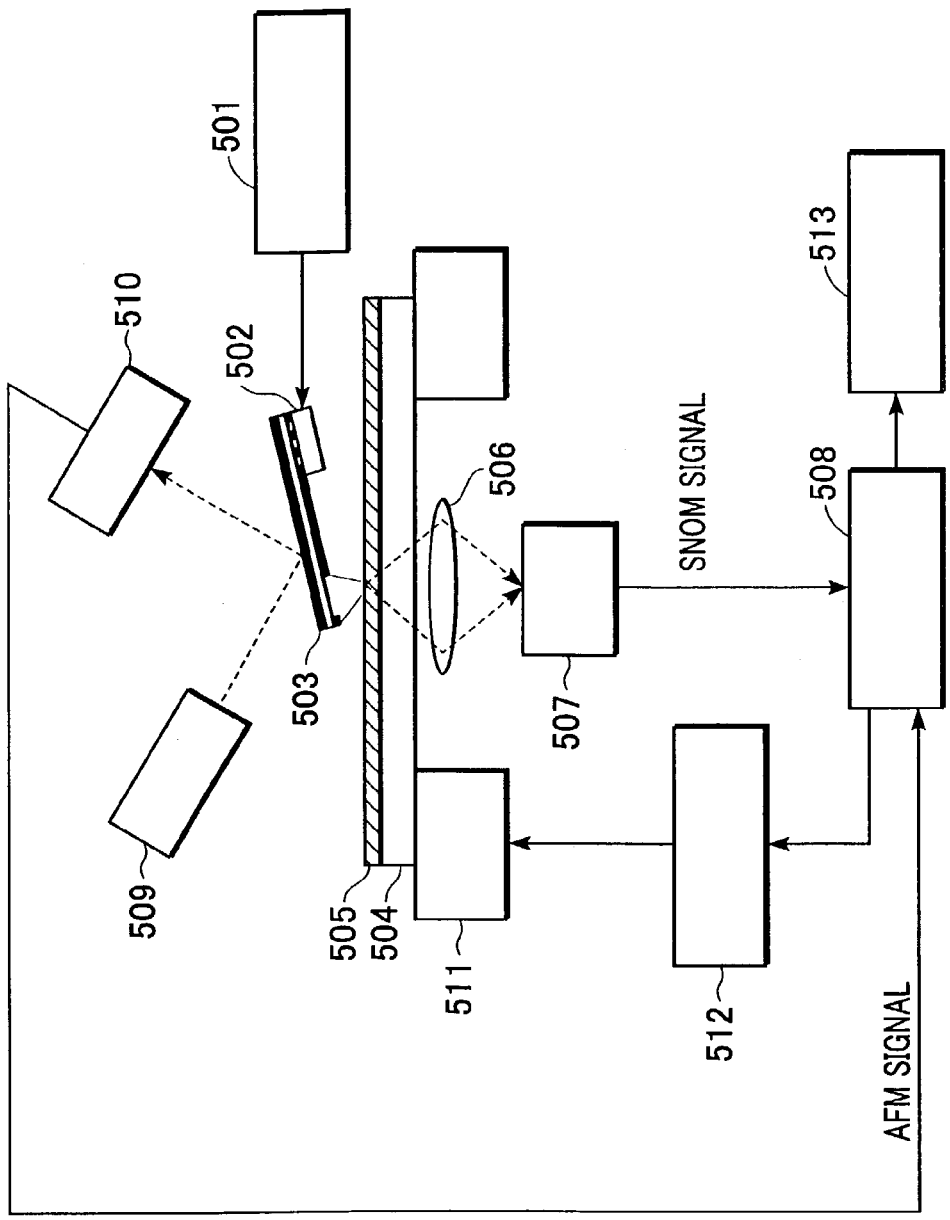
FIG. 5 is a diagram schematically showing the configuration of an apparatus in which a near-field light probe is applied to a scanning near-field optical microscope (SNOM) in the illumination mode in Example 5 of the present invention.

FIG. 5 is a diagram showing the configuration of an apparatus in which the near-field light probe is applied to a scanning near-field optical microscope (SNOM) in the illumination mode in Example 5 of the present invention.

As shown in FIG. 5, laser light emitted from a surface emission laser 502 driven by a laser driving circuit 501 is transmitted through a transmission path in a near-field probe 503, and is emitted as near-field light from a micro-aperture at the tip. This near-field light is applied to a specimen surface 505 on a substrate 504 at a small distance of 100 nm or less, the resulting scattered light is collected with a condenser lens 506, and is detected with a photomultiplier 507, so that an SNOM signal is produced, and is input into a measurement control computer 508.

On the other hand, laser light emitted from a laser 509 for AFM is applied to the reverse surface of a cantilever portion of the near-field probe, and a change in the angle of the reflected light thereof is detected with a two-way split sensor 510. The amount of bending of the cantilever is thereby detected, so that an atomic force microscope (AFM) signal is produced incorporating the specimen surface shape, and is input into the measurement control computer 508.

A driving signal for driving an xyz stage 511 is output from the measurement control computer 508 via a stage driving circuit 512, so that the three-dimensional location of the xyz stage 511 is controlled.

The measurement control computer 508 drives the xyz stage 511, allows the tip of the near-field probe 503 to scan the specimen 505, three-dimensionally plots SNOM signals and AFM signals in accordance with the locations thereof, and thereby forms a SNOM image and an AFM image of the specimen surface so as to display them on the display 513.

Since the SNOM apparatus in the illumination mode was constructed using the near-field light probe of the present invention, even when scanning was performed while the probe tip was in contact with a soft specimen, e.g. living body molecules, stable SNOM images and AFM images were able to be observed without damaging the specimen surface, because the top of the exterior of the micro-tip was flat, and without damaging the micro-tip itself. Furthermore, high-speed observation of the specimen was able to be performed because the near-field light was generated with high efficiency.

EXAMPLE 6

Figure 6:
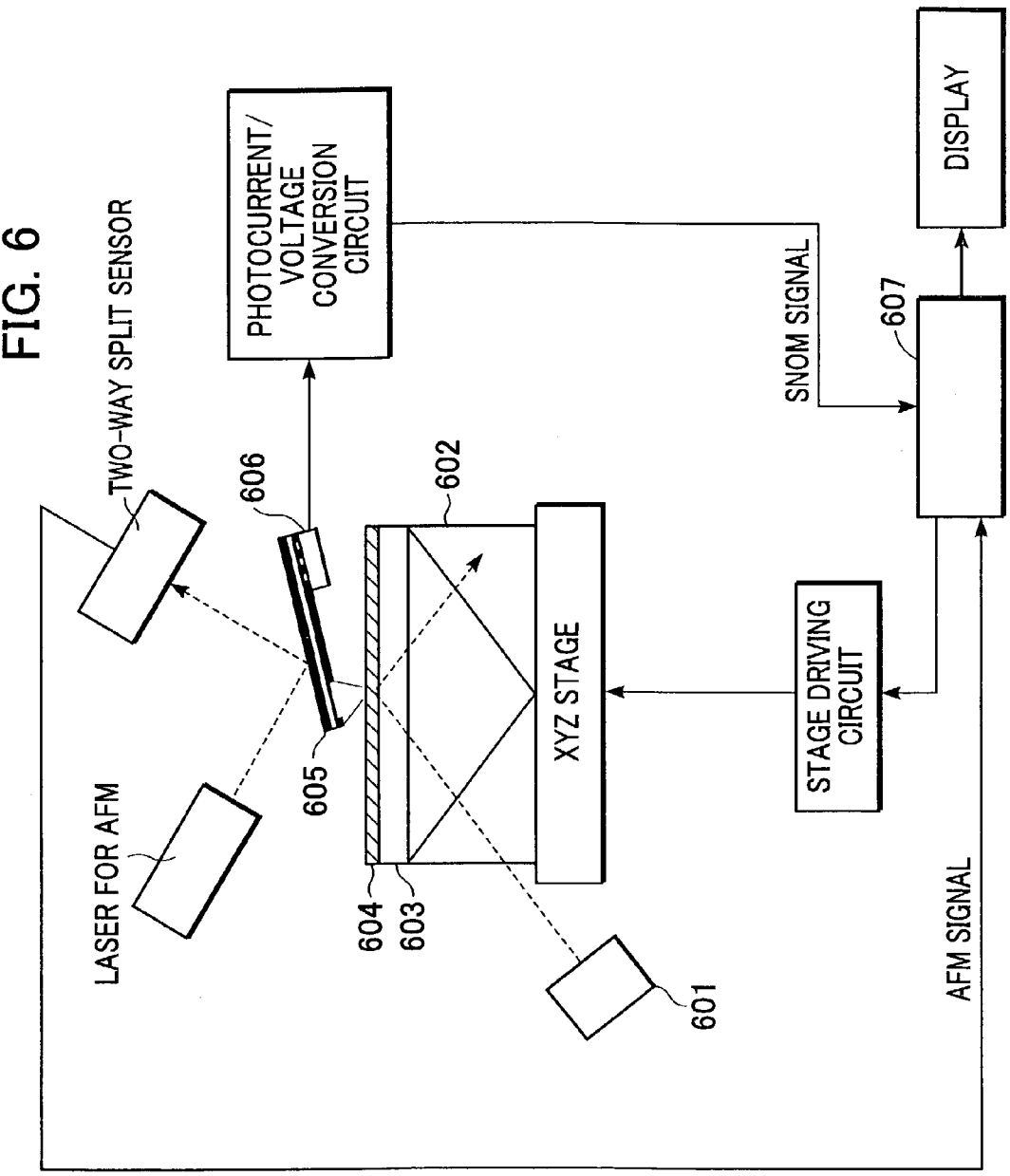
FIG. 6 is a diagram schematically showing the configuration of an apparatus in which a near-field light probe is applied to a SNOM in the collection mode in Example 6 of the present invention.

FIG. 6 is a diagram showing the configuration of an apparatus in which the near-field light probe is applied to an SNOM in the collection mode in Example 6 of the present invention.

As shown in FIG. 6, laser light emitted from a laser 601 for SNOM is entered into a specimen 604 on a substrate 603 provided on a rectangular prism 602 from the reverse surface at an angle of total reflection. The near-field light thereby generated on the specimen surface is detected with the micro-aperture at the tip of a near-field probe 605, and is transmitted through a transmission path in the near-field light probe, followed by detection with a photodiode 606, so that an SNOM signal is produced, and is input into a measurement control computer 607.

The operations are similar to that in the above-mentioned SNOM in the illumination mode except for that described above. Since the SNOM apparatus in the collection mode was constructed using the near-field light probe of the present invention, even when scanning was performed while the probe tip was in contact with a soft specimen, e.g. living body molecules, stable SNOM images and AFM images were able to be observed without damaging the specimen surface, because the top of the exterior of the micro-tip was flat, and without damaging the micro-tip itself. Furthermore, high-speed observation of the specimen was able to be performed because the near-field light was generated with high efficiency.

EXAMPLE 7

FIG. 7 is a diagram showing the configuration in which the near-field light probe is applied to a fine processing apparatus in Example 7 of the present invention.

As shown in FIG. 7, in a manner similar to that in the above-mentioned SNOM in the illumination mode, near-field light generated from the micro-aperture at the tip of a near-field light probe 701 is applied to a resist 702 on a substrate so as to perform exposure (formation of a latent image) of the resist 702. As a surface emission laser for exposure, a laser which generates light suitable for exposure of the resist 702 is used.

An AFM signal produced in a manner similar to that in the above-mentioned SNOM in the illumination mode is input into an alignment/exposure control computer 704 as a control signal for alignment, and is used for aligning the resist 702 with respect to the near-field light probe 701.

Since the fine processing apparatus was constructed using the near-field light probe of the present invention, even when scanning was performed while the probe tip was in contact with a soft specimen, e.g. living body molecules, stable fine-processing was able to be performed without damaging the specimen surface, because the top of the interior of the micro-tip was flat, and without damaging the micro-tip itself.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A probe for generating near-field light from an aperture by irradiating a tip having the aperture with polarized light, said probe comprising:
   said tip,
   wherein said tip comprises a cone-shaped lightproof member,
   wherein the top of said cone-shaped lightproof member is in the shape of a rectangular-shaped plane,
   wherein the aperture is provided in the rectangular-shaped plane of the top,
   wherein said cone-shaped lightproof member is configured so that irradiated polarized light is reflected at an inner surface of said cone-shaped lightproof member,
   wherein the width of the aperture is smaller than the wavelength of the irradiated polarized light,
   wherein the interior width of the rectangular-shaped plane of the top is larger than the width of the aperture,
   wherein the interior width of the rectangular-shaped plane of the top is in the range from 400 nm to 1400 nm, and
   wherein the irradiated polarized light is parallel to a long side or a short side of the rectangular-shaped plane of the top.

2. The probe according to claim 1, wherein the aperture is provided in the location including an electric-field-collecting point.

3. The probe according to claim 1, wherein the lightproof member is a rectangular pyramid.

4. The probe according to claim 1, wherein the exterior of the top is also in the shape of a plane.

5. A near-field light generation apparatus comprising the probe according to claim 1 and a light source device which applies light to the probe in order that an electric-field-collecting point nearest an apex of the lightproof member is generated in the vicinity of the top plane in the interior of the lightproof member.

6. The near-field light generation apparatus according to claim 5, wherein the aperture is provided in the location including an electric-field-collecting point.

7. The near-field light generation apparatus according to claim 5, wherein the interior of the probe is in the shape of a rectangular pyramid, and the light source device comprises a polarizing device for applying light polarized in the direction of the side of the rectangle.

8. A near-field light exposure apparatus comprising the probe according to claim 1, a light source device which applies light to the probe in order that an electric-field-collecting point nearest the apex of the lightproof member is generated in the vicinity of the top plane in the interior of the lightproof member, and a scanning device to perform scanning with the probe.

* * * * *